US012068103B2

United States Patent

Murakami et al.

(12) United States Patent
(10) Patent No.: US 12,068,103 B2
(45) Date of Patent: Aug. 20, 2024

(54) STATIONARY INDUCTION APPARATUS

(71) Applicant: Mitsubishi Electric Corporation, Tokyo (JP)

(72) Inventors: Kazuma Murakami, Tokyo (JP); Soichiro Kainaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 585 days.

(21) Appl. No.: 17/430,063

(22) PCT Filed: Mar. 27, 2019

(86) PCT No.: PCT/JP2019/013201
§ 371 (c)(1),
(2) Date: Aug. 11, 2021

(87) PCT Pub. No.: WO2020/194579
PCT Pub. Date: Oct. 1, 2020

(65) Prior Publication Data
US 2022/0139612 A1 May 5, 2022

(51) Int. Cl.
*H01F 27/30* (2006.01)
*H01F 27/24* (2006.01)
*H01F 27/28* (2006.01)

(52) U.S. Cl.
CPC ........... *H01F 27/306* (2013.01); *H01F 27/24* (2013.01); *H01F 27/2823* (2013.01)

(58) Field of Classification Search
CPC .... H01F 27/306; H01F 27/24; H01F 27/2823; H01F 27/34; H01F 2027/348;
(Continued)

(56) References Cited

U.S. PATENT DOCUMENTS 2,318,068 A * 5/1943 Elsner .................... H01F 27/343 336/184
2,904,619 A * 9/1959 Forney, Jr. ............... H01R 4/20 174/75 C
(Continued)

FOREIGN PATENT DOCUMENTS

JP S37032875 12/1962
JP H03039252 U 4/1991
(Continued)

OTHER PUBLICATIONS

International Search Report (PCT/ISA/210) and Written Opinion (PCT/ISA/237) mailed on Jun. 18, 2019, by the Japan Patent Office as the International Searching Authority for International Application No. PCT/JP2019/013201.
(Continued)

*Primary Examiner* — Mang Tin Bik Lian
(74) *Attorney, Agent, or Firm* — Buchanan Ingersoll & Rooney PC

(57) ABSTRACT

A connection sleeve connects two wire end portions adjacent to each other in an axial direction of a center axis, among wire end portions of flat-type wires that constitute each of a plurality of disc-shaped windings. A through hole allows the flat-type wire to be inserted from both sides. A pair of pressed portions sandwich the flat-type wire inserted in the through hole therebetween. At least one of a pair of end portions has a slit that divides an end surface when viewed from the direction in which a pair of end portions are aligned.

6 Claims, 9 Drawing Sheets

(58) Field of Classification Search
CPC .... H01F 27/2852; H01F 5/04; H01F 27/2828; H01F 27/2871; H01R 4/20
See application file for complete search history.

(56) References Cited

U.S. PATENT DOCUMENTS

| | | | | | |
|---|---|---|---|---|---|
| 3,006,983 | A * | 10/1961 | McDurmont | H01R 4/20 | 29/458 |
| 4,317,096 | A * | 2/1982 | Degeneff | H01F 27/363 | 336/70 |
| 6,261,137 | B1 * | 7/2001 | Wilcox | H01R 4/20 | 439/877 |
| 2009/0315419 | A1 * | 12/2009 | Mita | H01R 43/05 | 310/71 |
| 2014/0262437 | A1 * | 9/2014 | Dinh | H01R 4/20 | 174/135 |
| 2016/0134096 | A1 * | 5/2016 | Kett | H01R 4/20 | 174/360 |
| 2016/0268037 | A1 | 9/2016 | Nishimizu et al. | | |
| 2018/0269598 | A1 * | 9/2018 | Blumenshein | H01R 43/048 | |
| 2019/0356062 | A1 * | 11/2019 | Sato | H01R 4/029 | |

FOREIGN PATENT DOCUMENTS

| | | | |
|---|---|---|---|
| JP | H03043258 | U | 4/1991 |
| JP | H03110808 | U | 11/1991 |
| JP | H09251920 | A | 9/1997 |
| JP | 2008171634 | A | 7/2008 |
| JP | 2012195412 | A | 10/2012 |
| JP | 2013137879 | A | 7/2013 |
| JP | 2016167528 | A | 9/2016 |
| JP | 2019021741 | A | 2/2019 |

OTHER PUBLICATIONS

Notice of Reasons for Refusal in corresponding Application No. JP 2019-547734 dated Jan. 21, 2020, 12 pages.

Notice of Reasons for Refusal in corresponding Application No. JP 2019-547734 dated Nov. 5, 2019, 9 pages.

* cited by examiner

STATIONARY INDUCTION APPARATUS

TECHNICAL FIELD

The present invention relates to a stationary induction apparatus.

BACKGROUND ART

Japanese Patent Laying-Open No. 2012-195412 (PTL 1) discloses a configuration of a stationary induction apparatus. In the stationary induction apparatus described in PTL 1, a resin molded coil includes a winding portion and a resin mold layer. The winding portion is configured such that a plurality of section coils each formed by winding a winding conductor are arranged in an axial direction and connected in series. The respective inner diameter sides or the respective outer diameter sides of two section coils adjacent in the axial direction are conductively connected by a crossover conductor such that they have potentials equal to each other.

For example, a foil conductor made of an aluminum foil similar to the winding conductor can be used as the crossover conductor. The winding conductor and the crossover conductor can be bonded, for example, by soldering, brazing, pressure welding, or crimping.

CITATION LIST

Patent Literature

PTL 1: Japanese Patent Laying-Open No. 2012-195412

SUMMARY OF INVENTION

Technical Problem

In the conventional stationary induction apparatus, wire ends of flat-type wires that form two disc-shaped windings adjacent to each other among a plurality of disc-shaped windings may be sometimes connected to each other using a connection sleeve. In this case, leakage flux produced during operation of the stationary induction apparatus is incident on an end surface of the connection sleeve, causing eddy current at the end surface. Consequently, eddy current loss occurs.

The present invention is made in view of the problem above and an object of the present invention is to provide a stationary induction apparatus in which eddy current loss due to eddy current produced in a connection sleeve can be reduced.

Solution to Problem

A stationary induction apparatus based on the present invention includes a core, a plurality of disc-shaped windings, and a connection sleeve. Each of a plurality of disc-shaped windings is wound around the core as a center axis. The disc-shaped windings are configured such that the disc-shaped windings are stacked in an axial direction of the center axis. The connection sleeve connects two wire end portions adjacent to each other in the axial direction of the center axis, among wire end portions of flat-type wires that form each of the disc-shaped windings. The connection sleeve includes a through hole, a pair of pressed portions, and a pair of end portions. The through hole allows the flat-type wire to be inserted from both sides. The pair of pressed portions sandwich the flat-type wire inserted in the through hole therebetween. The pair of end portions are arranged in a direction orthogonal to each of a through direction of the through hole and a direction in which a pair of pressed portions are aligned. Each of the pair of end portions has an end surface positioned on an opposite side to a side closer to the through hole. At least one of the pair of end portions has a slit to divide the end surface when viewed from a direction in which the pair of end portions are aligned.

Advantageous Effects of Invention

The present invention can reduce eddy current loss by shortening a path of eddy current produced at the end surface of the connection sleeve.

DESCRIPTION OF EMBODIMENTS

Figure 1:
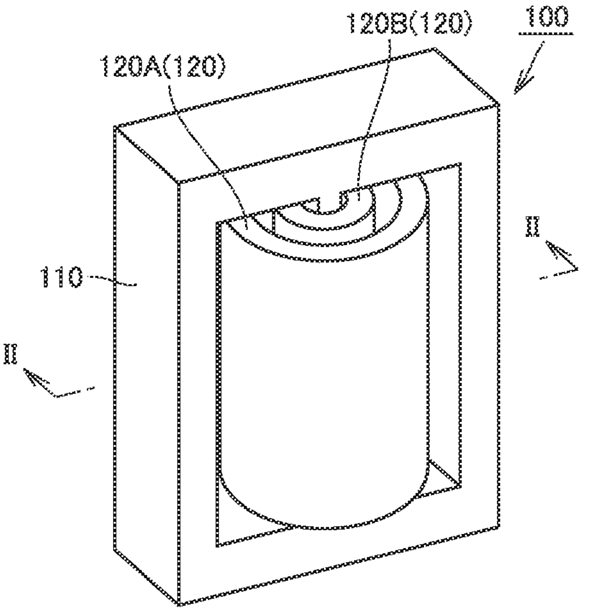
FIG. 1 is a perspective view showing the appearance of a stationary induction apparatus according to a first embodiment of the present invention.

A stationary induction apparatus according to embodiments of the present invention will be described below with reference to the drawings. In the following description of embodiments, like or corresponding parts in the drawings are denoted by like reference signs and a description thereof will not be repeated.

First Embodiment

Figure 2:
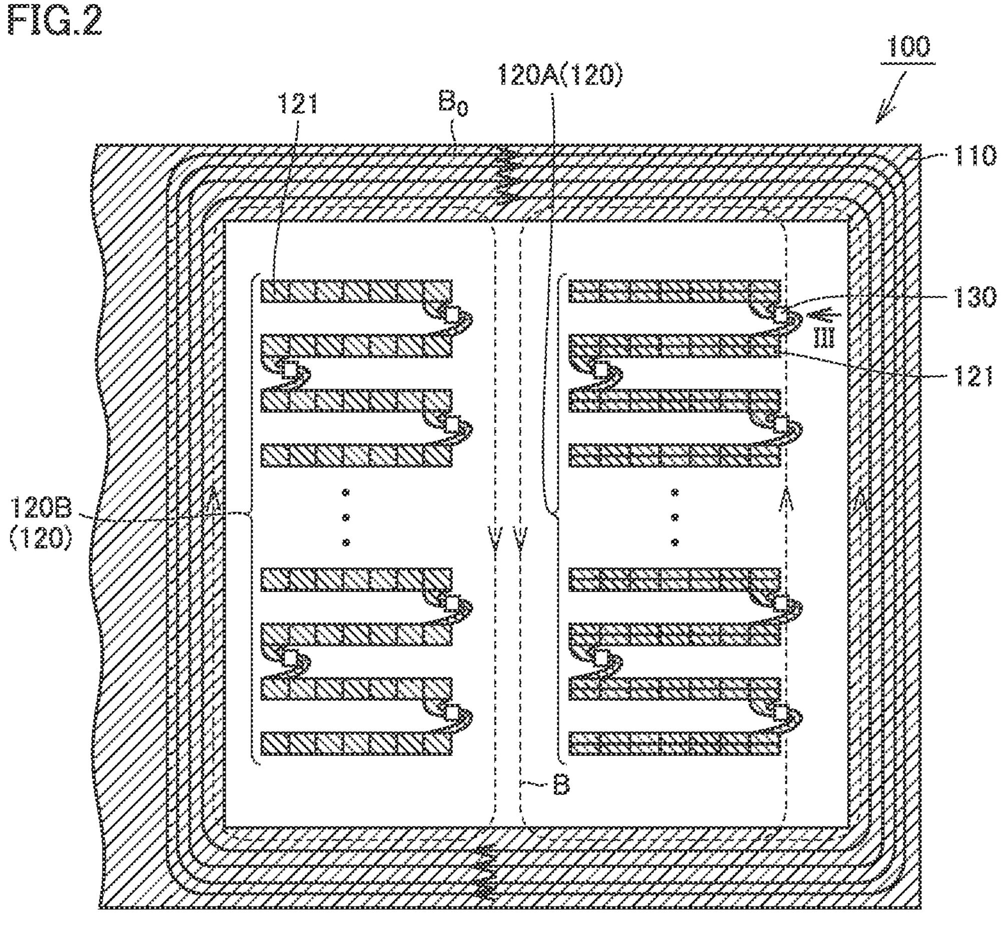
FIG. 2 is a partial cross-sectional view of the stationary induction apparatus in FIG. 1 as viewed from the direction of arrow II-II.

FIG. 1 is a perspective view showing the appearance of a stationary induction apparatus according to a first embodiment of the present invention. FIG. 2 is a partial cross-sectional view of the stationary induction apparatus in FIG. 1 as viewed from the direction of arrow II-II.

As shown in FIG. 1 and FIG. 2, a stationary induction apparatus 100 according to the first embodiment of the present invention is a core-type transformer. Stationary induction apparatus 100 includes a core 110, a high voltage winding 120A, a low voltage winding 120B, and a connection sleeve 130. High voltage winding 120A and low voltage winding 120B are concentrically wound around a main leg as the center axis of core 110.

Stationary induction apparatus 100 further includes a not-shown tank. The tank is filled with insulating oil or insulating gas that is an insulating medium and a cooling medium. For example, mineral oil, ester oil, or silicone oil is used as the insulating oil. For example, $SF_6$ gas or dry air is used as the insulating gas. Core 110, high voltage winding 120A, and low voltage winding 120B are accommodated in the tank.

As shown in FIG. 1 and FIG. 2, high voltage winding 120A is positioned on the outer side in the radial direction of the center axis with respect to low voltage winding 120B. As shown in FIG. 2, high voltage winding 120A is formed with a plurality of disc-shaped windings 120. Low voltage winding 120B is also formed with a plurality of disc-shaped windings 120. In this way, stationary induction apparatus 100 according to the first embodiment of the present invention includes a plurality of disc-shaped windings 120.

A plurality of disc-shaped windings 120 are configured such that a plurality of disc-shaped windings 120 are stacked in the axial direction of the center axis. Each of a plurality of disc-shaped windings 120 is wound around core 110 as the center axis.

Each of a plurality of disc-shaped windings 120 is formed with flat-type wires 121. In other words, disc-shaped winding 120 is formed by winding a plurality of flat-type wires 121 into a disc shape. Flat wire 121 includes an electric wire portion having a substantially rectangular shape in cross section and an electric wire insulating coating covering the electric wire portion.

A plurality of disc-shaped windings 120 adjacent to each other in the axial direction of the center axis are electrically connected to each other by connection sleeve 130 at an outer peripheral end or an inner peripheral end. In the present embodiment, a plurality of disc-shaped windings 120 are mechanically connected by connection sleeve 130 at the outer peripheral end or the inner peripheral end.

Figure 3:
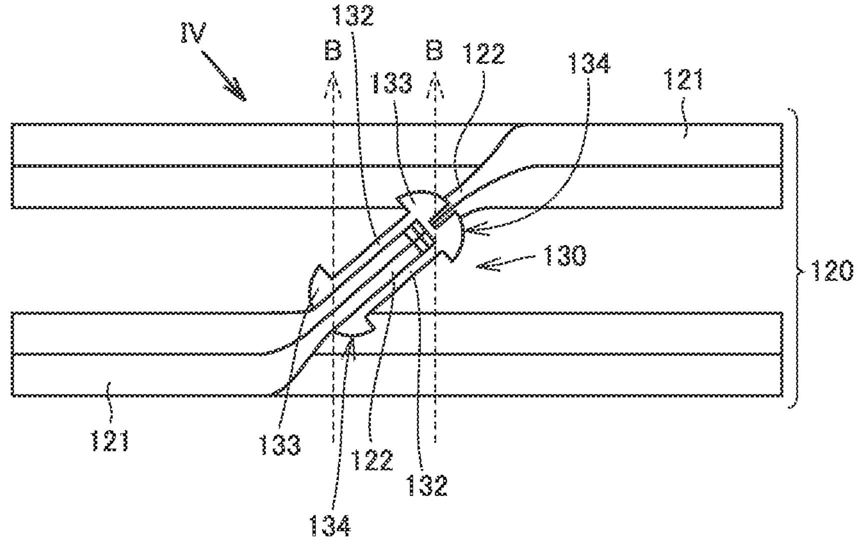
FIG. 3 is a partially enlarged view showing a configuration of a connection sleeve when the stationary induction apparatus shown in FIG. 2 is viewed from the direction of arrow III.
Figure 4:
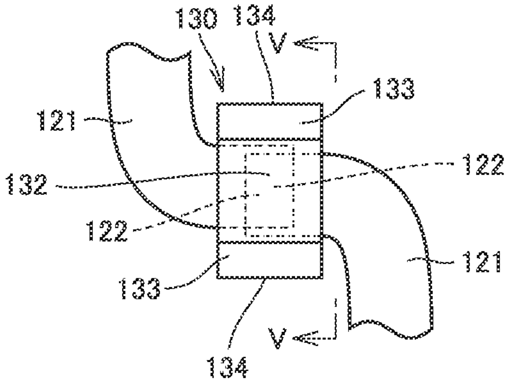
FIG. 4 is a diagram showing a configuration of the connection sleeve when the stationary induction apparatus shown in FIG. 3 is viewed from the direction of arrow IV.
Figure 5:
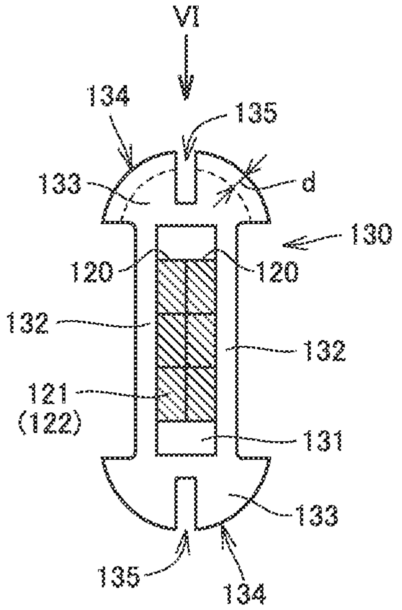
FIG. 5 is a diagram of the connection sleeve shown in FIG. 4 as viewed from the direction of arrow V-V.
Figure 6:
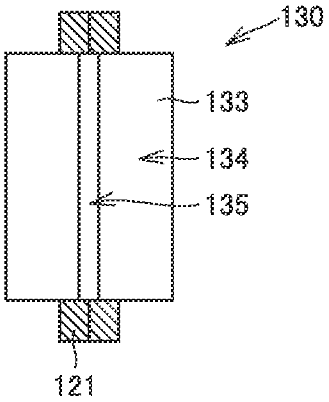
FIG. 6 is a diagram of the connection sleeve in the stationary induction apparatus shown in FIG. 5 as viewed from the direction of arrow VI.

FIG. 3 is a partially enlarged view showing a configuration of the connection sleeve when the stationary induction apparatus shown in FIG. 2 is viewed from the direction of arrow III. FIG. 4 is a diagram showing a configuration of the connection sleeve when the stationary induction apparatus shown in FIG. 3 is viewed from the direction of arrow IV. FIG. 5 is a diagram of the connection sleeve shown in FIG. 4 as viewed from the direction of arrow V-V. FIG. 6 is a diagram of the connection sleeve in the stationary induction apparatus shown in FIG. 5 as viewed from the direction of arrow VI.

As shown in FIG. 2 to FIG. 4, connection sleeve 130 connects two wire end portions 122 adjacent to each other in the axial direction of the center axis, among wire end portions 122 of flat-type wires 121.

As shown in FIG. 5, in the present embodiment, each of a plurality of disc-shaped windings 120 is formed with a plurality of flat-type wires 121. In other words, disc-shaped winding 120 is a flatwise multiple coil of flat-type wires 121. Disc-shaped winding 120 therefore includes a plurality of wire end portions 122 that are end portions of flat-type wires 121 on each of the outer peripheral end side and the inner peripheral end side. In the present embodiment, a plurality of wire end portions 122 included in disc-shaped windings 120 adjacent to each other are connected to each other by one connection sleeve 130.

When each of a plurality of disc-shaped windings 120 so many wire end portions 122 that wire end portions 122 are unable to be connected to each other by one connection sleeve 130, a plurality of wire end portions 122 included in disc-shaped windings 120 adjacent to each other in the axial direction may be connected to each other by a plurality of connection sleeves 130.

As shown in FIG. 5, connection sleeve 130 includes a through hole 131, a pair of pressed portions 132, and a pair of end portions 133. As shown in FIG. 3 to FIG. 6, flat-type wire 121 can be inserted into through hole 131 from both sides. A pair of pressed portions 132 sandwich flat-type wire 121 inserted in through hole 131 therebetween.

Specifically, first, wire end portion 122 of flat-type wire 121 that constitutes one disc-shaped winding 120 of disc-shaped windings 120 adjacent to each other in the axial direction is inserted from one end of through hole 131, and wire end portion 122 of flat-type wire 121 that constitutes the other disc-shaped winding 120 of disc-shaped windings 120 adjacent to each other in the axial direction is inserted from the other end of through hole 131. In the present embodiment, wire end portions 122 of three flat-type wires 121 that constitute the above-noted one disc-shaped winding 120 and wire end portions 122 of three flat-type wires 121 that constitute the above-noted other disc-shaped winding 120 are arranged so as to be overlapped in the direction in which a pair of pressed portions 132 are aligned, and thereafter a pair of pressed portions 132 are pressed from the outside and deformed in the direction in which a pair of pressed portions 132 are aligned. Thus, wire end portions 122 of three flat-type wires 121 that constitute the one disc-shaped winding 120 and wire end portions 122 of three flat-type wires 121 that constitute the other disc-shaped winding 120 are crimped to each other and electrically and mechanically connected to each other.

Wire end portions 122 of three flat-type wires 121 that constitute the one disc-shaped winding 120 and wire end portions 122 of three flat-type wires 121 that constitute the other disc-shaped winding 120 may be electrically connected while being fixed to each other by pressing and deforming a pair of pressed portions 132 from the outside, with their tip end surfaces in contact with each other, rather than being overlapped in the direction in which a pair of pressed portions are aligned.

As shown in FIG. 5, in the present embodiment, when viewed from the through direction of through hole 131, a pair of pressed portions 132 are positioned inside both ends of end portions 133 in a direction in which a pair of pressed portions are aligned. This can suppress leakage flux described later from being incident on pressed portions 132.

As shown in FIG. 4 to FIG. 6, a pair of end portions 133 are arranged in a direction orthogonal to each of the through direction of through hole 131 and the direction in which a pair of pressed portions 132 are aligned. Each of a pair of end portions 133 has an end surface 134 positioned on the opposite side to the side closer to through hole 131.

As shown in FIG. 5, end surface 134 is formed with a curved surface having a substantially arc shape when viewed from the through direction of through hole 131.

End surface 134 may be formed with a flat surface. End surface 134 may be formed in a polygonal shape when viewed from the through direction of through hole 131.

As shown in FIG. 5 and FIG. 6, at least one of a pair of end portions 133 has a slit 135 that divides end surface 134 when viewed from the direction in which a pair of end portions 133 are aligned. In other words, as shown in FIG. 6, when viewed from the direction in which a pair of end portions 133 are aligned, end surface 134 is divided into a plurality of regions by slit 135. In the present embodiment, slit 135 is provided in each of a pair of end portions 133. As shown in FIG. 2 and FIG. 3, connection sleeve 130 is arranged such that end surface 134 having slit 135 intersects the axial direction of the center axis. In other words, end surface 134 is not positioned parallel to the axial direction of the center axis.

As shown in FIG. 5, slit 135 is formed in a depressed strip. Slit 135 may be formed in a V shape when viewed from the through direction of through hole 131.

As shown in FIG. 5 and FIG. 6, in the present embodiment, the depth direction of slit 135 is substantially the same as the direction in which a pair of end portions 133 are aligned. As shown in FIG. 5, in an embodiment of the present invention, the depth of slit 135 is greater than a skin depth d of a material that forms at least one of a pair of end portions 133 in operation of stationary induction apparatus 100. Skin depth d is a distance necessary for incident magnetic flux to attenuate by 1/e, that is, approximately by 1/2.718.

Skin depth d can be represented as $d=1/(\pi f\mu\sigma)^{1/2}$ using operating frequency f of stationary induction apparatus 100, and magnetic permeability μ and permittivity a of the material that forms connection sleeve 130. In the present embodiment, the material that forms connection sleeve 130 is, for example, oxygen-free copper having magnetic permeability μ of $4\pi\times10^{-7}$ H/m and permittivity a of $5.82\times10^{7}$ S/m. Therefore, when the material that forms connection sleeve 130 is oxygen-free copper, and operating frequency f of stationary induction apparatus 100 is 100 Hz, skin depth d is 6.6 mm, and when operating frequency f of stationary induction apparatus 100 is 10 Hz, skin depth d is 0.66 mm.

Connection sleeve 130 is formed of, for example, metal such as oxygen-free copper. Connection sleeve 130 may be formed of metal coated with an insulating layer.

Leakage flux produced in stationary induction apparatus 100 according to the first embodiment of the present invention will be described below. As shown in FIG. 2, main magnetic flux Bo is produced in core 110. Leakage flux B leaking out of core 110 is also produced.

The magnetic line of leakage flux B is positioned on each of the outer peripheral side and the inner peripheral side of high voltage winding 120A. The magnetic line of leakage flux B is positioned at least on the outer peripheral side of low voltage winding 120B. In this way, the magnetic line of leakage flux B positioned on each of the outer peripheral side and the inner peripheral side of a plurality of disc-shaped windings 120 is oriented in a direction parallel to the axial direction of the center axis.

As shown in FIG. 3, when the magnetic line of leakage flux B intersects end surface 134 of connection sleeve 130, eddy current due to leakage flux B is produced at end surface 134.

Figure 7:
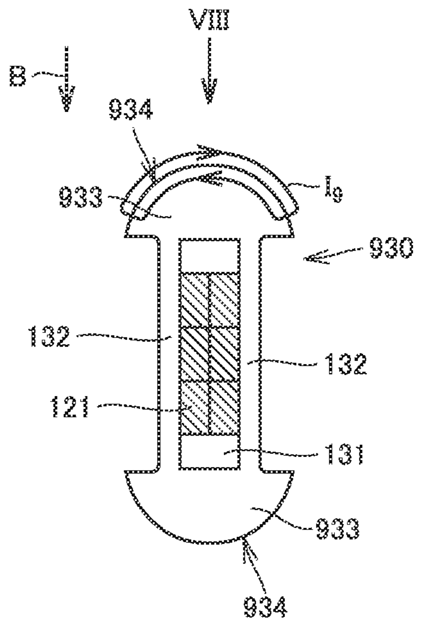
FIG. 7 is a diagram showing a connection sleeve according to a comparative example.
Figure 8:
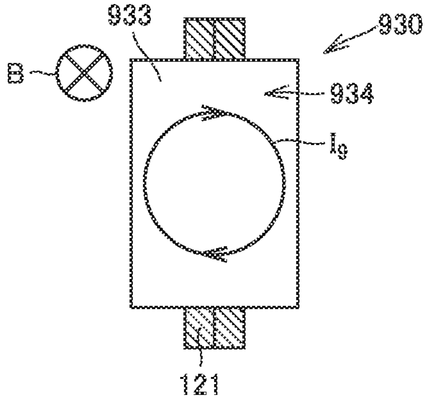
FIG. 8 is a diagram of the connection sleeve shown in FIG. 7 as viewed from the direction of arrow VIII.

Here, a path of eddy current produced in a connection sleeve according to a comparative example having no slit on the end surface of the connection sleeve will be described. FIG. 7 is a diagram showing a connection sleeve according to a comparative example. FIG. 8 is a diagram of the connection sleeve shown in FIG. 7 as viewed from the direction of arrow VIII.

As shown in FIG. 7 and FIG. 8, when viewed from the direction in which a pair of end portions 933 are aligned, eddy current $I_9$ having a substantially circular path is produced along the outer periphery of an end surface 934 in at least one end portion 933 of connection sleeve 930 according to the comparative example. The path of eddy current $I_9$ has a circular shape having a diameter of approximately the same length as the length in the lateral direction of end surface 934 when viewed from the direction in which a pair of end portions 933 are aligned. FIG. 7 and FIG. 8 show a case in which the magnetic line of leakage flux B incident on end surface 934 is oriented in the direction in which a pair of end portions 933 are aligned. In FIG. 7, the path of eddy current $I_9$ is schematically shown.

Figure 9:
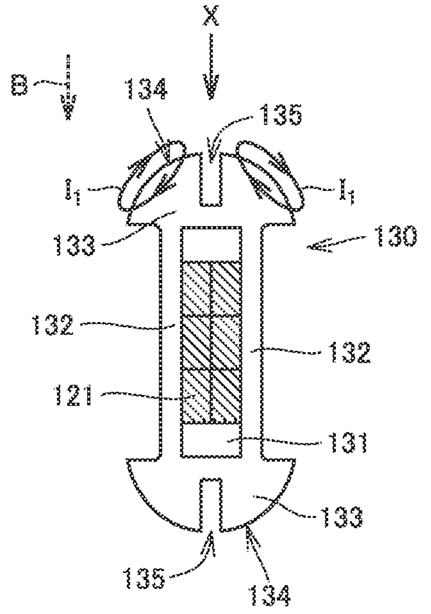
FIG. 9 is a diagram showing eddy current produced in the connection sleeve in the stationary induction apparatus according to the first embodiment of the present invention.
Figure 10:
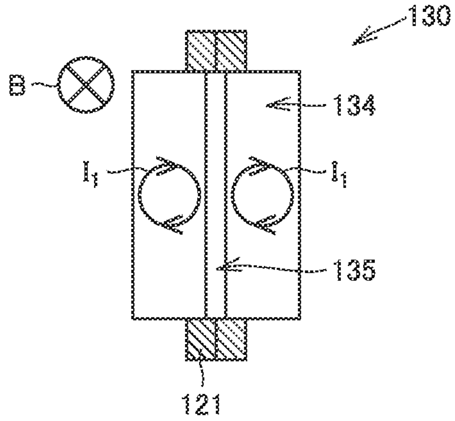
FIG. 10 is a diagram showing the connection sleeve in FIG. 9 as viewed from the direction of arrow X.

FIG. 9 is a diagram showing eddy current produced in the connection sleeve in the stationary induction apparatus according to the first embodiment of the present invention. FIG. 10 is a diagram showing the connection sleeve in FIG. 9 as viewed from the direction of arrow X. In FIG. 9 and FIG. 10, the magnetic line of leakage flux B incident on end surface 134 is oriented in the direction in which a pair of end portions 133 are aligned. In FIG. 9, the path of eddy current $I_1$ is schematically shown.

As shown in FIG. 9 and FIG. 10, in connection sleeve 130 according to the first embodiment of the present invention, since at least one of a pair of end portions 133 has slit 135 that divides end surface 134 when viewed from the direction in which a pair of end portions 133 are aligned, eddy current $I_1$ is produced in each of the divided two regions in end surface 134.

In the present embodiment, when viewed from the direction in which a pair of end portions 133 are aligned, slit 135 extends in a direction parallel to the longitudinal direction of end surface 134 and divides end surface 134 into substantially two halves. When viewed from the direction in which a pair of end portions 133 are aligned, therefore, the path of each of two eddy currents $I_1$ has a circular shape having a diameter with a length substantially half the length in the lateral direction of end surface 134.

As described above, in stationary induction apparatus 100 according to the present embodiment, because of provision of slit 135, the length of the path of eddy current $I_1$ is reduced compared with the length of the path of eddy current $I_9$ in the comparative example.

The amount of heat generated by eddy current, that is, eddy current loss is proportional to the square of the diameter of a circle that forms the path of eddy current. Then, when eddy current loss due to eddy current $I_9$ produced in connection sleeve 930 in the comparative example is 1, the eddy current loss per eddy current $I_1$ produced in connection sleeve 130 in the embodiment of the present invention is $(1/2)^2=1/4$. Therefore, the sum of eddy current loss produced in connection sleeve 130 in the present embodiment is $(1/4)\times2=1/2$ compared with the eddy current loss produced in connection sleeve 930 in the comparative example. In this way, the eddy current loss in connection sleeve 130 in an embodiment of the present invention is substantially half the eddy current loss in connection sleeve 930 in the comparative example.

As described above, in stationary induction apparatus 100 according to the first embodiment of the present invention, connection sleeve 130 includes through hole 131, a pair of pressed portions 132, and a pair of end portions 133. Flat-type wire 121 can be inserted into through hole 131 from both sides. A pair of pressed portions 132 sandwich flat-type wire 121 inserted in through hole 131 therebetween. A pair of end portions 133 are arranged in a direction orthogonal to each of the through direction of through hole 131 and the direction in which a pair of pressed portions 132 are aligned. Each of a pair of end portions 133 has end surface 134 positioned on the opposite side to the side closer to through hole 131. At least one of a pair of end portions 133 has slit 135 that divides end surface 134 when viewed from the direction in which a pair of end portions 133 are aligned.

This configuration can shorten the path of eddy current $I_1$ produced at end surface 134 of connection sleeve 130 and therefore can reduce eddy current. Furthermore, heating of connection sleeve 130 due to generation of eddy current can be suppressed.

In stationary induction apparatus 100 according to the first embodiment of the present invention, the depth of slit 135 is greater than skin depth d of a material that forms at least one of a pair of end portions 133 in operation of stationary induction apparatus 100.

This configuration can suppress eddy current $I_1$ produced in connection sleeve 130 from passing through a portion below the bottom surface of slit 135 and flowing on end surface 134, thereby shortening the path of eddy current $I_1$ more reliably.

In stationary induction apparatus 100 according to the first embodiment of the present invention, connection sleeve 130 is arranged such that end surface 134 having slit 135 intersects the axial direction of the center axis.

This configuration can shorten the path of eddy current $I_1$ produced on end surface 134 by leakage flux B when the magnetic line of leakage flux B is produced along the axial direction of the center axis. This configuration can reduce eddy current loss in connection sleeve 130.

Figure 11:
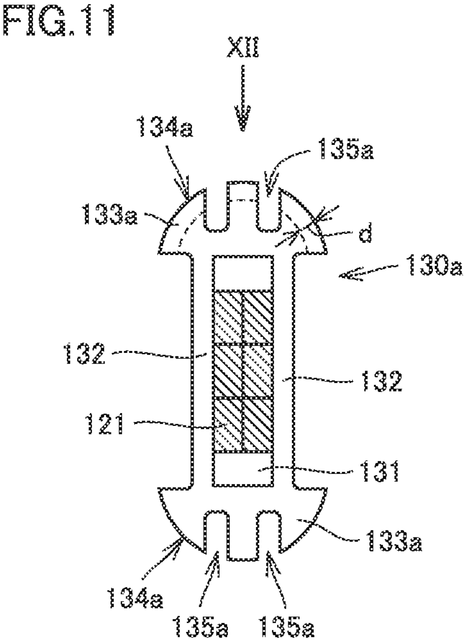
FIG. 11 is a diagram showing a connection sleeve in the stationary induction apparatus according to a first modification to the first embodiment of the present invention.
Figure 12:
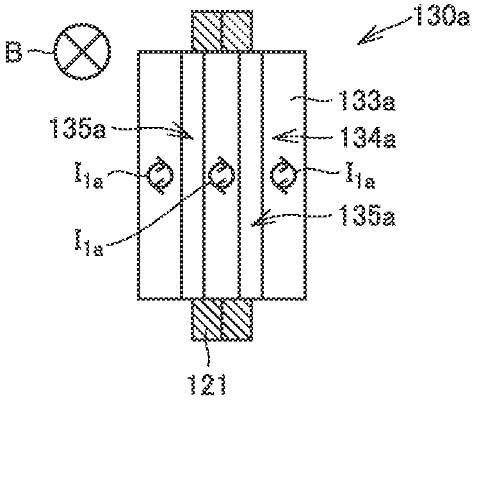
FIG. 12 is a diagram showing the connection sleeve in FIG. 11 as viewed from the direction of arrow XII.

In the first embodiment of the present invention, end surface 134 may have a plurality of slits. FIG. 11 is a diagram showing a connection sleeve in the stationary induction apparatus according to a first modification to the first embodiment of the present invention. FIG. 12 is a diagram showing the connection sleeve in FIG. 11 as viewed from the direction of arrow XII.

As shown in FIG. 11 and FIG. 12, in the stationary induction apparatus according to the first modification to the first embodiment of the present invention, two slits 135*a* are formed at end surface 134*a* in each of a pair of end portions 133*a* of connection sleeve 130*a*. Two slits 135*a* extend in parallel with each other when viewed from the direction in which a pair of end portions 133*a* are aligned.

As shown in FIG. 11 and FIG. 12, because of provision of a plurality of slits 135*a*, the path per eddy current $I_{1a}$ can be further shortened. Consequently, eddy current loss in connection sleeve 130*a* can be further reduced.

Figure 13:
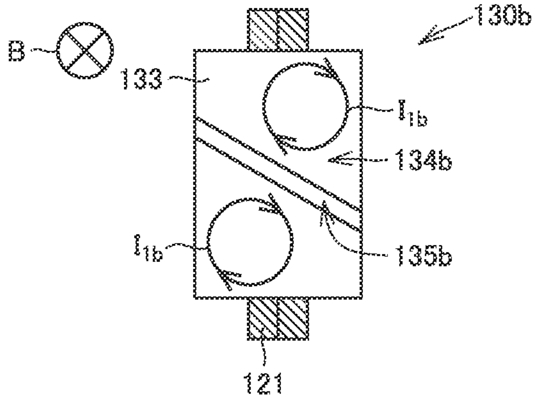
FIG. 13 is a diagram showing a connection sleeve in the stationary induction apparatus according to a second modification to the first embodiment of the present invention.

In the first embodiment of the present invention, when viewed from the direction in which a pair of end portions 133 are aligned, the slit does not necessarily extend in a direction parallel to the longitudinal direction of end surface 134. FIG. 13 is a diagram showing a connection sleeve in the stationary induction apparatus according to a second modification to the first embodiment of the present invention. FIG. 13 shows a connection sleeve 130*b* viewed from the direction in which a pair of end portions 133 are aligned.

As shown in FIG. 13, in the second modification to the first embodiment of the present invention, when viewed from the direction in which a pair of end portions 133 are aligned, a slit 135*b* extends in a direction intersecting each of the longitudinal direction and the lateral direction of end surface 134*b*.

Figure 14:
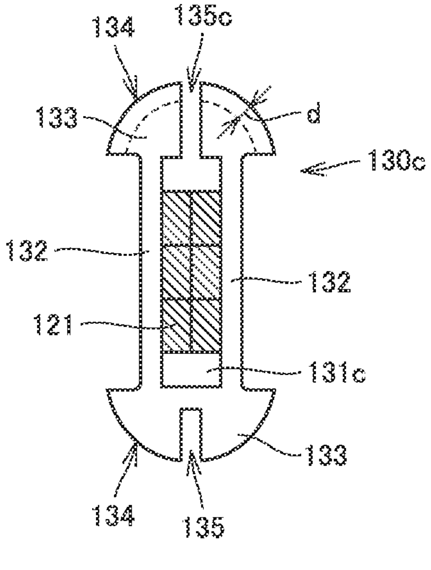
FIG. 14 is a diagram showing a connection sleeve in the stationary induction apparatus according to a third modification to the first embodiment of the present invention.

In the first embodiment of the present invention, the slit may reach the through hole. FIG. 14 is a diagram showing a connection sleeve in the stationary induction apparatus according to a third modification to the first embodiment of the present invention. In the stationary induction apparatus according to the third modification to the first embodiment of the present invention, a slit 135*c* is provided so as to reach through hole 131*c* in one end portion 133 of a pair of end portions 133.

Even when slit 135*c* reaches through hole 131*c*, the path of eddy current produced on end surface 134 can be shortened similarly to the first embodiment of the present invention shown in FIG. 9 and FIG. 10. Accordingly, eddy current loss can be reduced.

Since a pair of pressed portions 132 need to be formed with a one-piece member, connection sleeve 130*c* has only one slit 135*c* that reaches through hole 131*c*.

Second Embodiment

A stationary induction apparatus according to a second embodiment of the present invention will be described below. The stationary induction apparatus according to the second embodiment of the present invention differs from stationary induction apparatus 100 according to the first embodiment of the present invention only in configuration of the connection sleeve, and a configuration similar to the stationary induction apparatus according to the first embodiment of the present invention will not be repeated.

Figure 15:
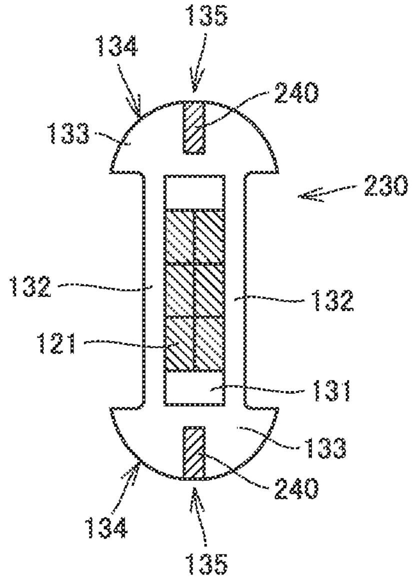
FIG. 15 is a diagram showing a configuration of a connection sleeve in a stationary induction apparatus according to a second embodiment of the present invention.

FIG. 15 is a diagram showing a configuration of the connection sleeve in the stationary induction apparatus according to the second embodiment of the present invention. The connection sleeve shown in FIG. 15 corresponds to the connection sleeve in stationary induction apparatus 100 according to the first embodiment of the present invention shown in FIG. 5.

In the stationary induction apparatus according to the second embodiment of the present invention, an insulating member 240 is arranged in slit 135 formed at end portion 133 of connection sleeve 230. In the present embodiment, insulating member 240 is arranged to fill in slit 135 over the entire length in the depth direction of slit 135. In the present embodiment, a gap may be provided partially between insulating member 240 and an inner wall of slit 135.

For example, pressboard can be used as a material that forms insulating member 240. It is preferable that the thermal expansion coefficient of the material that forms insulating member 240 is close to the value of the thermal expansion coefficient of the material that forms each of end portion 133 and pressed portion 132.

In the second embodiment of the present invention, when viewed from the direction in which a pair of end portions 133 are aligned, slit 135 extends in a direction parallel to the longitudinal direction of end surface 134, similarly to the first embodiment of the present invention.

The configuration of slit 135 in the second embodiment of the present invention is not limited to the shape described above. In the second embodiment of the present invention, a slit similar to each modification of the first embodiment of the present invention may be provided.

As described above, in the second embodiment of the present invention, since insulating member 240 is arranged in slit 135, the mechanical strength of connection sleeve 230 can be improved, compared with connection sleeve 130 in stationary induction apparatus 100 according to the first embodiment of the present invention. Even in the stationary induction apparatus according to the second embodiment of the present invention, the path of eddy current produced on end surface 134 can be reduced and therefore eddy current loss can be reduced.

Third Embodiment

A stationary induction apparatus according to a third embodiment of the present invention will be described. The stationary induction apparatus according to the third embodiment of the present invention differs from the first embodiment of the present invention in that it is a shell-type transformer, and a configuration similar to the stationary induction apparatus according to the first embodiment of the present invention will not be repeated.

Figure 16:
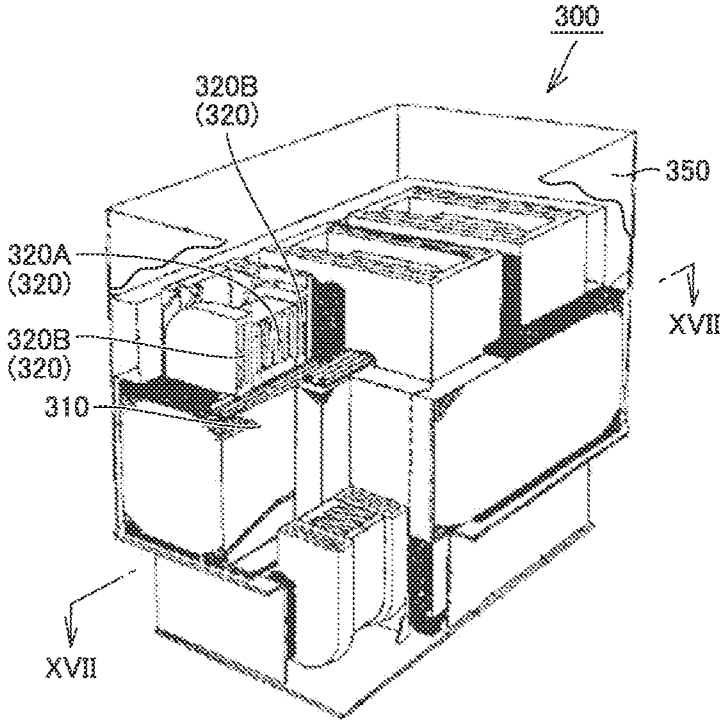
FIG. 16 is a perspective view showing the appearance of a stationary induction apparatus according to a third embodiment of the present invention.
Figure 17:
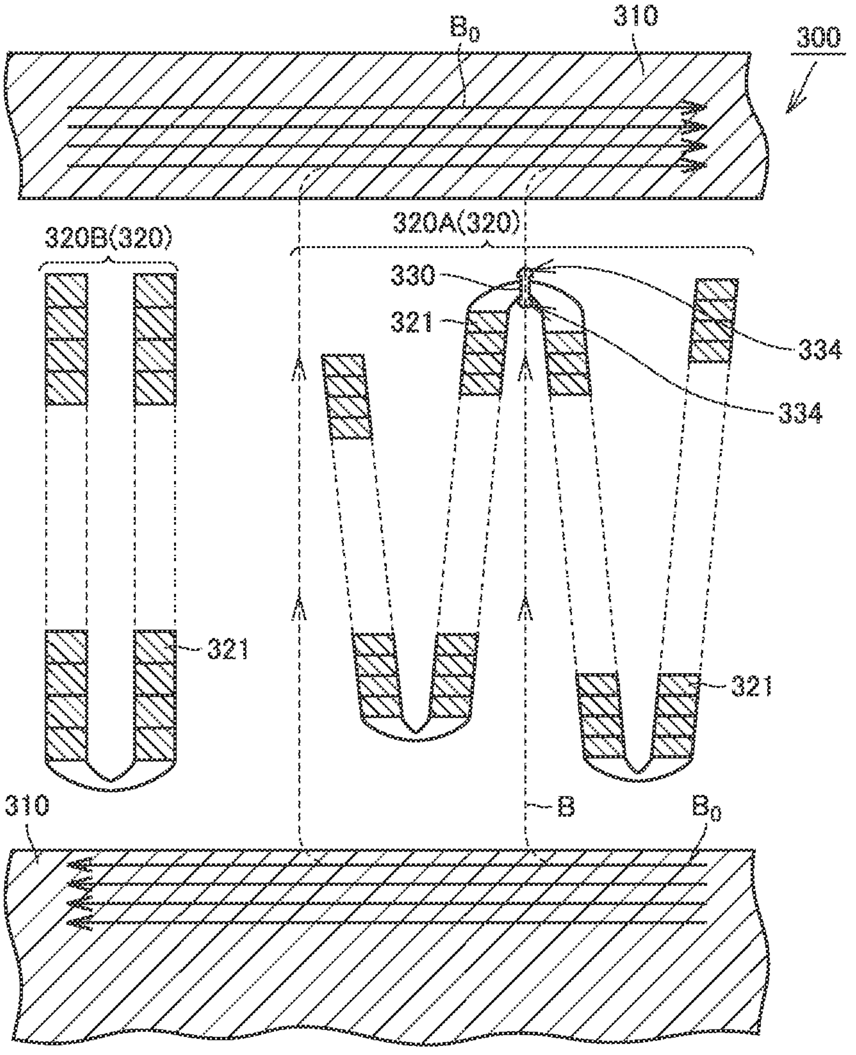
FIG. 17 is a partial cross-sectional view of the stationary induction apparatus in FIG. 16 as viewed from the direction of arrow XVII-XVII.

FIG. 16 is a perspective view showing the appearance of a stationary induction apparatus according to the third embodiment of the present invention. FIG. 17 is a partial cross-sectional view of the stationary induction apparatus shown in FIG. 16 as viewed from the direction of arrow XVII-XVII.

As shown in FIG. 16 and FIG. 17, a stationary induction apparatus 300 according to the third embodiment of the present invention is a shell-type transformer. Stationary induction apparatus 300 includes a core 310, a high voltage winding 320A, a low voltage winding 320B, and a connection sleeve 330. High voltage winding 320A and low voltage winding 320B are arranged coaxially around the main leg of core 310 as the center axis.

Stationary induction apparatus 300 further includes a tank 350. Tank 350 is filled with insulating oil or insulating gas that is an insulating medium and a cooling medium. The insulating oil is, for example, mineral oil, ester oil, or silicone oil, and the insulating gas is, for example, $SF_6$ gas or dry air. Core 310, high voltage winding 320A, and low voltage winding 320B are accommodated in tank 350.

As shown in FIG. 16, in a direction along the center axis, high voltage winding 320A is arranged so as to be sandwiched between low voltage windings 320B. As shown in FIG. 17, high voltage winding 320A is configured such that a plurality of disc-shaped windings formed by winding flat-type wires 321 into a disc shape are stacked in the axial direction of the center axis. Flat wire 321 includes an electric wire portion having a substantially rectangular shape in lateral cross section and an insulating coating portion covering the electric wire portion. Low voltage winding 320B has a configuration similar to high voltage winding 320A. In this way, stationary induction apparatus 300 according to the third embodiment of the present invention includes a plurality of disc-shaped windings 320.

In the present embodiment, high voltage winding 320A includes two disc-shaped windings 320 with respective inner peripheral ends being continuous. In the present embodiment, in high voltage winding 320A, one disc-shaped winding pair in which two disc-shaped windings 320 are continuous at inner peripheral ends and the other disc-shaped winding pair in which two disc-shaped windings 320 are continuous at inner peripheral ends are aligned in the axial direction and connected to each other. The outer peripheral end of disc-shaped winding 320 adjacent to the other disc-shaped winding pair of the one disc-shaped winding pair and the outer peripheral end of disc-shaped winding 320 adjacent to the one disc-shaped winding pair of the other disc-shaped winding pair are electrically and mechanically connected to each other by connection sleeve 330.

As shown in FIG. 17, main magnetic flux Bo is produced in core 310. Leakage flux B leaking out of core 310 is also produced.

The magnetic line of leakage flux B passes between a plurality of disc-shaped windings 320 adjacent to each other in the axial direction of the center axis. Specifically, it passes between two disc-shaped windings 320 connected by connection sleeve 330. The magnetic line of leakage flux B is oriented in a direction parallel to the radial direction of the center axis.

As shown in FIG. 17, in stationary induction apparatus 300 according to the third embodiment of the present invention, connection sleeve 330 is arranged such that end surface 334 having a slit intersects the radial direction of the center axis. More specifically, end surface 334 is arranged orthogonally to the radial direction of the center axis.

When end surface 334 is arranged to intersect the radial direction of the center axis and the magnetic line of leakage flux B is oriented in a direction parallel to the radial direction of the center axis, the path of eddy current produced on end surface 334 can be shortened because of the slit described above, similarly to the first embodiment. With this configuration, eddy current loss can be reduced. Furthermore, heating of connection sleeve 330 due to generation of eddy current can be suppressed.

The slit in the third embodiment of the present invention is provided similarly to the first embodiment of the present invention or each modification of the first embodiment of the present invention. An insulating member may be arranged in the slit, similarly to the second embodiment of the present invention.

In the description of the embodiments above, a core-type transformer and a shell-type transformer have been described as the stationary induction apparatus. However, the stationary induction apparatus may be any other stationary induction apparatuses such as a reactor.

In the foregoing embodiments, mutually combinable configurations can be combined as appropriate.

The foregoing embodiments disclosed here are illustrative in all respects and are not intended to provide a basis for limited interpretation. The technical scope of the present invention should not be interpreted only with the foregoing embodiments. All modifications that come within the meaning and range of equivalence to the claims are embraced here.

REFERENCE SIGNS LIST

100, 300 stationary induction apparatus, 110, 310 core, 120, 320 disc-shaped winding, 120A, 320A high voltage winding, 120B, 320B low voltage winding, 121, 321 flat-type wire, 122 wire end portion, 130, 130*a*, 130*b*, 130*c*, 230, 330, 930 connection sleeve, 131, 131*c* through hole, 132 pressed portion, 133, 133*a*, 933 end portion, 134, 134*a*, 134*b*, 334, 934 end surface, 135, 135*a*, 135*b*, 135*c* slit, 240 insulating member, 350 tank.

The invention claimed is:

1. A stationary induction apparatus comprising:

a core;

a plurality of disc-shaped windings wound around the core as a center axis and stacked in an axial direction of the center axis; and a connection sleeve to connect two wire end portions adjacent to each other in the axial direction of the center axis, among wire end portions of flat-type wires that constitute each of the disc-shaped windings, the connection sleeve including a through hole to allow the flat-type wire to be inserted from both sides, a pair of pressed portions to sandwich the flat-type wire inserted in the through hole therebetween, and a pair of end portions arranged in a direction orthogonal to each of a through direction of the through hole and a direction in which the pair of pressed portions are aligned, wherein the pair of pressed portions are positioned inside both ends of the pair of end portions in a direction in which the pair of pressed portions are aligned when viewed from the through direction of the through hole, each of the pair of end portions has an end surface positioned on an opposite side to a side closer to the through hole, at least one of the pair of end portions has a slit to divide the end surface when viewed from a direction in which the pair of end portions are aligned, and an insulating member is arranged in the slit.

2. The stationary induction apparatus according to claim 1, wherein the slit is positioned away from both ends of the end surface in the through direction of the through hole when viewed from the direction in which the pair of end portions are aligned.

3. The stationary induction apparatus according to claim 1, wherein the slit has a depth greater than a skin depth of a material that forms at least one of the pair of end portions in operation of the stationary induction apparatus.

4. The stationary induction apparatus according to claim 1, wherein the slit reaches the through hole.

5. The stationary induction apparatus according to claim 1, wherein the connection sleeve is arranged such that the end surface having the slit intersects the axial direction of the center axis.

6. The stationary induction apparatus according to claim 1, wherein the connection sleeve is arranged such that the end surface having the slit intersects a radial direction of the center axis.

* * * * *